US007597817B1

(12) United States Patent
Li et al.

(10) Patent No.: US 7,597,817 B1
(45) Date of Patent: *Oct. 6, 2009

(54) MAGNETIC DOPED PEROVSKITE OXIDES

(75) Inventors: Yi-Qun Li, Walnut Creek, CA (US); Ning Wang, Martinez, CA (US); Qizhen Xue, Walnut Creek, CA (US); Shifan Cheng, Moraga, CA (US); Xiao-Dong Xiang, Danville, CA (US)

(73) Assignee: Intematix Corporation, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/829,590

(22) Filed: Apr. 21, 2004

(51) Int. Cl.
  *H01F 1/03* (2006.01)
  *C01F 11/00* (2006.01)
  *C01F 17/00* (2006.01)

(52) U.S. Cl. .................. 252/62.51 R; 501/135; 501/138

(58) Field of Classification Search ... 252/62.57–62.59, 252/62.62, 62.51 R, 62.51 C, 62.9 R, 62.9 PZ; 204/192.15, 192.2, 192.22, 192.26; 501/134–136, 501/138
See application file for complete search history.

(56) References Cited

U.S. PATENT DOCUMENTS 5,434,742 A * 7/1995 Saito et al. .............. 361/321.5

6,641,940 B1 * 11/2003 Li et al. .............. 428/702
2005/0006249 A1 * 1/2005 Suzuki et al. .............. 205/633

FOREIGN PATENT DOCUMENTS

| JP | 4-56080 | * 2/1992 |
| WO | WO01/77024 | * 10/2001 |
| WO | WO 03/040058 | * 5/2003 |

OTHER PUBLICATIONS

Chemical abstract cit 34:140214 P'rvanova et al "Study of some electrophysical properties of the systems (1-x)BaTiO3-xZnTiO3 and (1-x)BaTiO-xNiTiO3", 1998.*
Chenical abstract cit. 132:312137 Langhammer et al, "Crystal structure and related propeties of manganese-doped barium titnate ceramics", Jour. Amer. Cer. Soc. 83(3), 2000, pp. 605-611.*
Chemical abstracts cit. 140:311312 Srivastava et al, "Moessbauer, EPR and IR studies of some (Pb,Fe)TiO3 and (Sr,Fe)TiO3 ceramic dielectrics", Indian Jour. Phys A, 776(6), 2003, pp. 571-574.*

* cited by examiner

*Primary Examiner*—C. Melissa Koslow
(74) *Attorney, Agent, or Firm*—Fliesler Meyer LLP

(57) ABSTRACT

Novel metal oxide compositions are disclosed. These ferromagnetic or ferrimagnetic compositions have resitivities that vary between those of semiconducting and insulating materials, and they further exhibit Curie temperatures greater than room temperature (i.e., greater than 300 K). They are perovskite structures with the general chemical formulas $(A_{1-x}M_x)BO_3$, $(A_{1-x}M_x)(B'B'')O_3$ or $A(B_{1-x}M_x)O_3$, where A can be a $1^+$, $2^+$ and $3^+$ charged ion; B can be a $5^+$, $4^+$, $3^+$ charged ion; B' and B'' can be $2^+$, $3^+$, $4^+$, $5^+$ and $6^+$ charged ion. M is a magnetic ion dopant. X-ray diffraction patterns are presented for exemplary compositions.

7 Claims, 10 Drawing Sheets

MAGNETIC DOPED PEROVSKITE OXIDES

This application claims priority under 35 U.S.C. § 119 to U.S. Provisional Application No. 60/436,102 entitled Magnetic Doped Perovskite Oxides and filed on Dec. 20, 2002.

FIELD OF THE INVENTION

This invention releases to provision of new compositions of metal oxide materials that have ferromagnetic or ferrimagnetic properties and have resistivity in a range from semiconducting to insulating.

BACKGROUND OF THE INVENTION

Recent discovery of optically induced quantum coherent spin-state in semiconductors has opened up a wide range of possibilities of spin-controlled devices, such as ultra-high speed spin-controlled-optical switching and modulation, and quantum spin phase logic devices. One of the major technical barriers to realize the implementation of these devices is the proper spin injection contact materials that will effectively inject spin polarized electrons into semiconductors. One approach is the development of room temperature ferromagnetic semiconductors. Spin injection through a ferromagnetic semiconductor heterostructure has been demonstrated. So far, there is no ferromagnetic or ferrimagnetic materials have Curie temperature higher than room temperature (300 K) and a resistivity of semiconductors. Most of ferromagnetic oxides are either metals or insulators. (Ga,Mn)As is only ferromagnetic semiconductor but its Curie temperature is as low as 120 K. Some theoretical and experimental works indicate that (GaMn)N may exhibit room temperature ferromagnetism. But, unfortunately, the experimental result of Curie temperature of such material is only 250 K. Several ferromagnetic metal oxides such as (La,M)MnO$_3$ (M=Ca, Sr, Ba, Pb, ...), Sr(M$_{0.5}$Mo$_{0.5}$)O$_3$ (M=Fe, Mn, Co, Cr, ...) have also been investigated for spin injection materials. However, these families of ferromagnetic oxides behave as metals with a relative high conductivity rather than semiconductors. Therefore, there is an urgent need to invent new materials that will enable effective injection of nearly 100% spin polarized electrons into semiconductors switched by low magnetic field at room temperature.

SUMMARY OF THE INVENTION

These needs are met by the invention, which provides several groups of compound semiconductor oxides in which spontaneous magnetization is existed with Curie temperatures higher than room temperature (>300 K) and their conductivity can be controlled in a range from semiconducting to insulating.

General chemical compositions for groups of oxide materials with simple perovskite structures are (A$_{1-x}$M$_x$)BO$_3$, (A$_{1-x}$M$_x$)(B'B'')O$_3$ or A(B$_{1-x}$M$_x$)O$_3$, (where A can be 1$^+$, 2$^+$ and 3$^+$ ions; B can be 5$^+$, 4$^+$, and 3$^+$ ions; B' and B'' can be 2$^+$, 3$^+$, 4$^+$, 5$^+$ and 6$^+$ ions, and M is a magnetic ion dopant). Specific examples are (A$_{1-x}$M$_x$)TiO$_3$, (A$_{1-x}$M$_x$)ZrO$_3$, (A$_{1-x}$M$_x$)SnO$_3$, (A$_{1-x}$B$_x$)HfO$_3$, La(Mo$_{1-x}$M$_x$)O$_3$, and Sr(Ti$_{1-x}$M$_x$)O$_3$ where A=Ca, Sr, Ba, Pb, and Cd and M=Fe, Ni, Co, and Mn with 0<x<0.15.

According to these embodiments, the non-magnetic element A in a ferromagnetic perovskite oxide material having the formula (A$_{1-x}$M$_x$)BO$_3$, where A is at least one non-magnetic element selected from the group consisting of Ca, Sr, Ba, Pb, Y, La, and Gd. The element B is at least one non-magnetic element selected from the group consisting of Ti, Zr, Hf, Sn, Mo, Ta, W, Nb, Al, and Bi. The element M is at least one magnetic element selected from the group consisting of Fe, Co, Ni, Cr, Mn, and V. In one embodiment the index "x" ranges from greater than 0 to less than 0.15. Thus "x" ranges from 0 to 0.15 when A is Ca or Ba; B is Ti, Zr, or Hf; and M is Fe, Co, or Ni.

Furthermore, according to these embodiments, the saturation magnetizations for the ferromagnetic perovskite oxides having the formulas (Ba$_{0.95}$Fe$_{0.05}$)TiO$_3$, (Ca$_{0.95}$Fe$_{0.05}$)TiO$_3$, (Ba$_{0.95}$Fe$_{0.05}$)ZrO$_3$, (Ca$_{0.95}$Fe$_{0.05}$)ZrO$_3$, (Ba$_{0.95}$Fe$_{0.05}$)HfO$_3$, and (Ca$_{0.95}$Fe$_{0.05}$)HfO$_3$ may have the saturation magnetizations of about 0.10, 0.11, 0.11, 0.12, 0.125, and 0.12 $\mu_B$/mol Fe at 300 K, respectively. Also, according to these embodiments, the coercive fields may be about 16, 12, 25, 4.5, 20, and 7 Oe at 300 K for the same six compounds, again, respectively.

DESCRIPTION OF BEST MODES OF THE INVENTION

The invention includes general chemical compositions of the forms

where A can be $1^+$, $2^+$ and $3^+$ ions; B can be $5^+$, $4^+$, and $3^+$ ions; B' and B" can be $2^+$, $3^+$, $4^+$, $5^+$ and $6^+$ ions, M is a magnetic ion dopant such as Fe, Co, Ni and Mn.

Examples are:

$(A_{1-x}M_x)TiO_3$, $(A_{1-x}M_x)ZrO_3$, $(A_{1-x}M_x)SnO_3$, $(A_{1-x}M_x)HfO_3$, $A(B_{1-x}M_x)O_3$ where A=Ca, Sr, Ba, Pb, Cd, La, B=Mo, Ti, and M=Fe, Ni, Co, Mn with 0<x<0.15. Representative bulk and thin film materials from these groups have been prepared by conventional ceramic powder process, ceramic solution process, and ion beam sputtering deposition, Laser ablation deposition respectively, for the choices of A=Ca and Ba, and, B=Ti and Mo, M=Fe, Co, and Ni.

Bulk samples of $(Ba_{1-x}Fe_x)TiO_3$ with x=0.01, 0.02, 0.03, 0.05, 0.07, and 0.1.

Bulk samples of $(Ca_{0.95}M_{0.05})TiO_3$ with M=Fe, Co, and Ni.

Bulk samples of $(Ba_{1-x}Fe_x)TiO_3$ with M=Fe, Co, and Ni.

Bulk samples of $(Ca_{0.95}Fe_{0.05})BO_3$ with B=Ti, Zr, and Hf.

Bulk samples of $(Ba_{0.95}Fe_{0.05})BO_3$ with B=Ti, Zr, and Hf.

Bulk sample of $La(Mo_{0.25}Fe_{0.75})O_3$.

Bulk sample of $Sr(Ti_{0.95}Fe_{0.05})O_3$.

Raw materials for preparing these samples are: Ba: $BaTiO_3$ or $BaCO_3$, Ca: CaO or $CaTiO_3$, Ti: $TiO_2$, Zr: $ZrO_2$, Hf: $HfO_2$, Fe: $Fe_2O_3$, Co: CoO, and Ni: NiO, La: $La_2O_3$, Mo: $MoO_2$, Sr: $SrCO_3$.

A method for producing these bulk ceramic materials comprises the following procedures:

1. Weighing the metal oxides according to the designed chemical stoichiometry.
2. Mixing these powders with solvent or water by ball milling for 20 minutes.
3. Drying the powder at 100° C. for 1 hour.
4. The powder was calcined at 1100° C. for 7 hours in air.
5. After ball milling, the dry powder was pressed into a cylinder pellet with a pressure of 100 Mpa.
6. These pellets were fired at 1200-1350° C. for 9-24 hours in $N_2+H_2$ or air atmosphere.

Figure 1A:
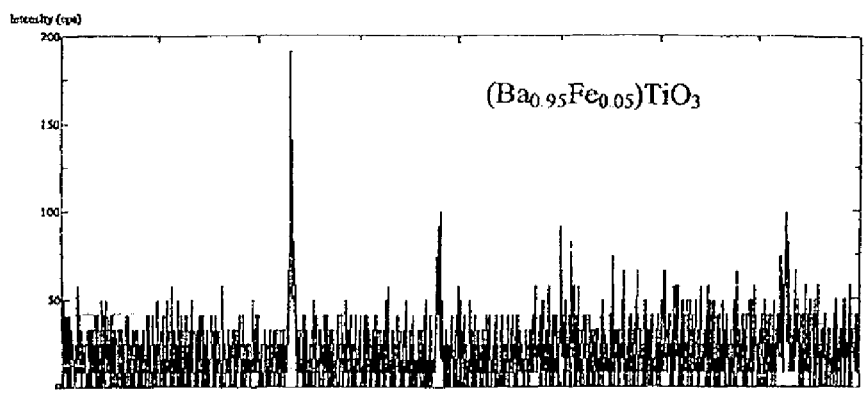
FIGS. 1a, 1b, 1c, and 1d are theta-2 theta x-ray diffraction patterns for (Ba$_{0.94}$Fe$_{0.05}$)TiO$_3$ (Ba$_{0.94}$Co$_{0.05}$)TiO$_3$, (Ba$_{0.94}$Ni$_{0.05}$)TiO$_3$, and (Ba$_{0.94}$Fe$_{0.05}$)ZrO$_3$, respectively.
Figure 1B:
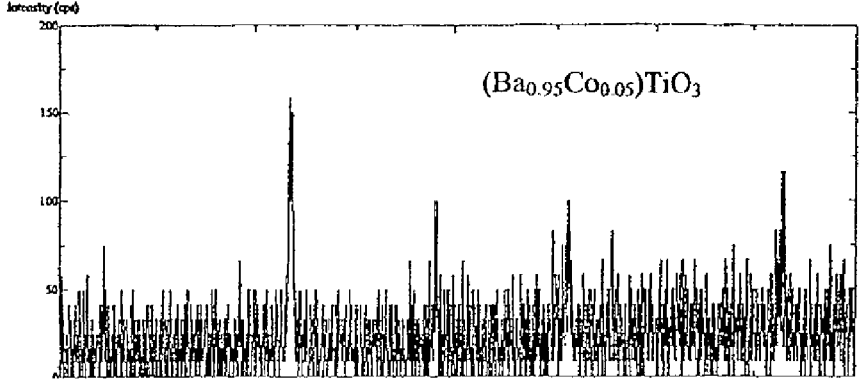
Figure 1C:
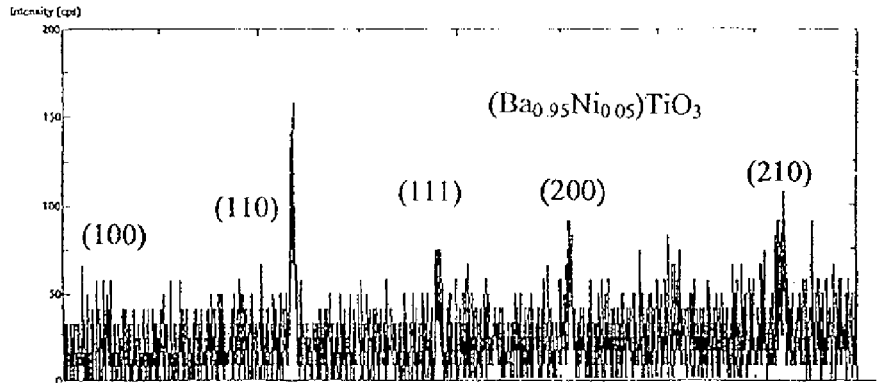
Figure 1D:
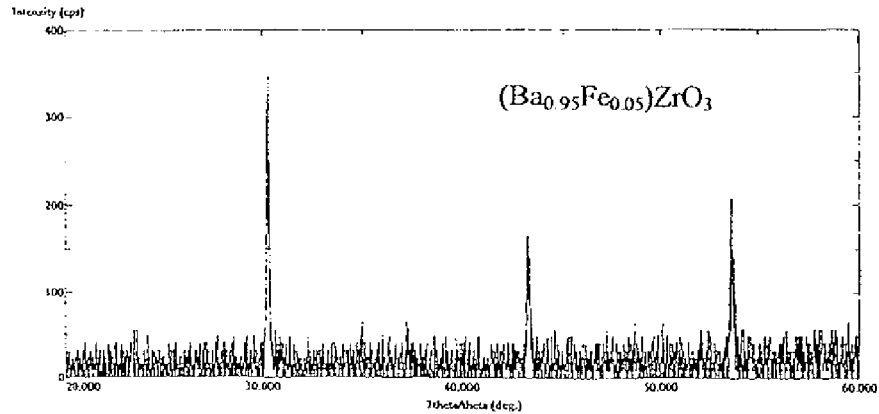
Figure 2:
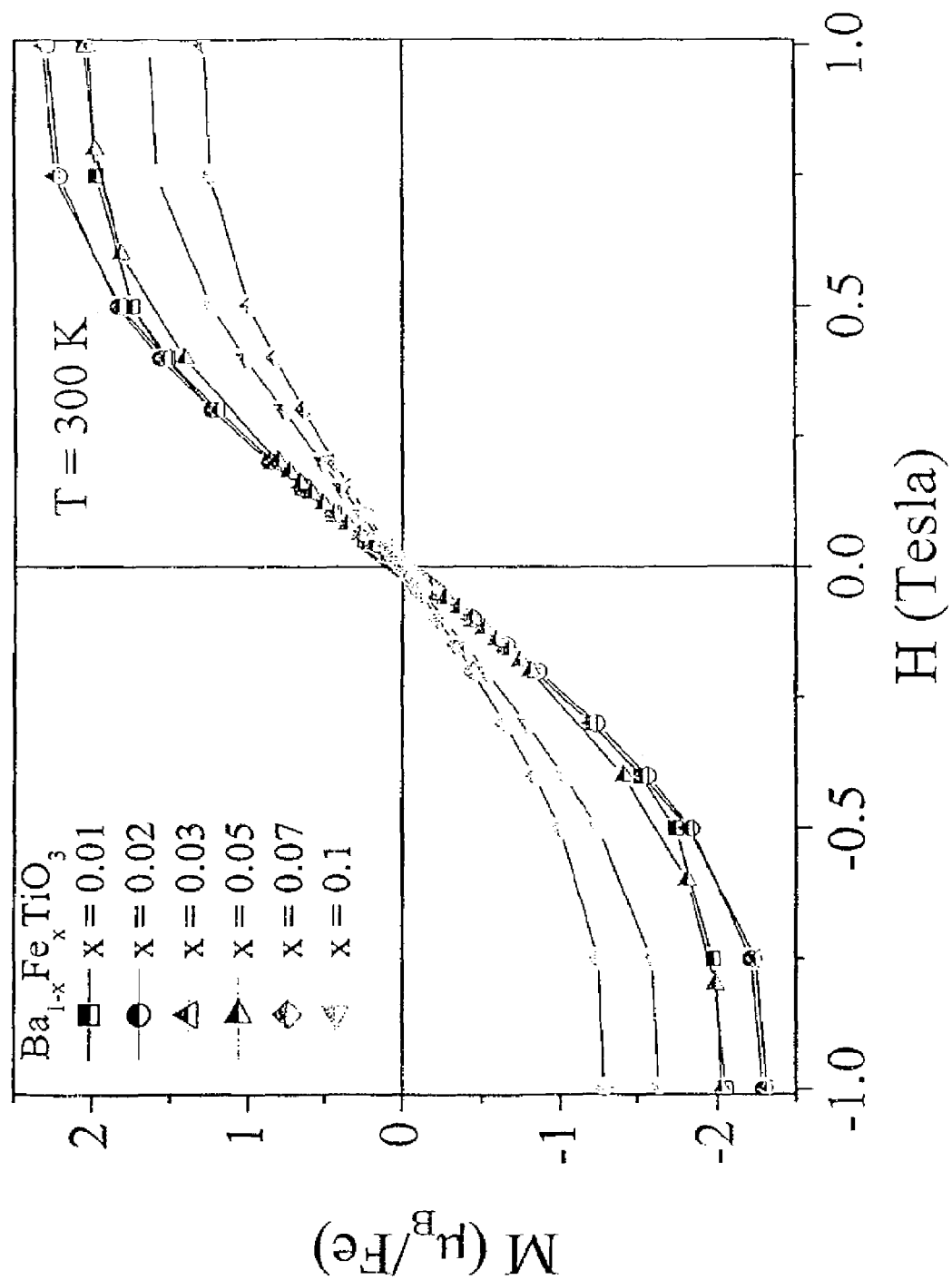
FIG. 2 illustrates plots of magnetization ($\mu_B$/Fe) measured as a function of magnetic field at a temperature of 300 K by SQUID magnetometer for a series of (Ba$_{1-x}$Fe$_x$)TiO$_3$ with x=0.01, 0.02, 0.03, 0.05, 0.07, and 0.1.

The samples of $(Ba_{1-x}Fe_x)O_2$ with X=0.01, 0.02, 0.03, 0.05, 0.07, and 0.1 exhibit magnetic properties with a increased saturation magnetization as X increases. The calculations of magnetization as contributed from each Fe ion are plotted in FIG. 2. The sample with X from 0.01 to 0.05 has a similar magnetization per Fe ion with 2 Bohr magnetrons per Fe, which is about half of a pure $Fe^{++}$ ion. Magnetization per Fe decreases as substitution of Fe to Ba increases for more than 5%. The result indicates that the solutability of Fe in A site of BaTiO3 is about 5% due to the large difference of ion size between $Ba^{2++}$ and $Fe^{2++}$. The precipitation of either $Fe_2O_3$ or $Fe_3O_4$ has magnetization per Fe less than 2 Bohr.

Figure 3:
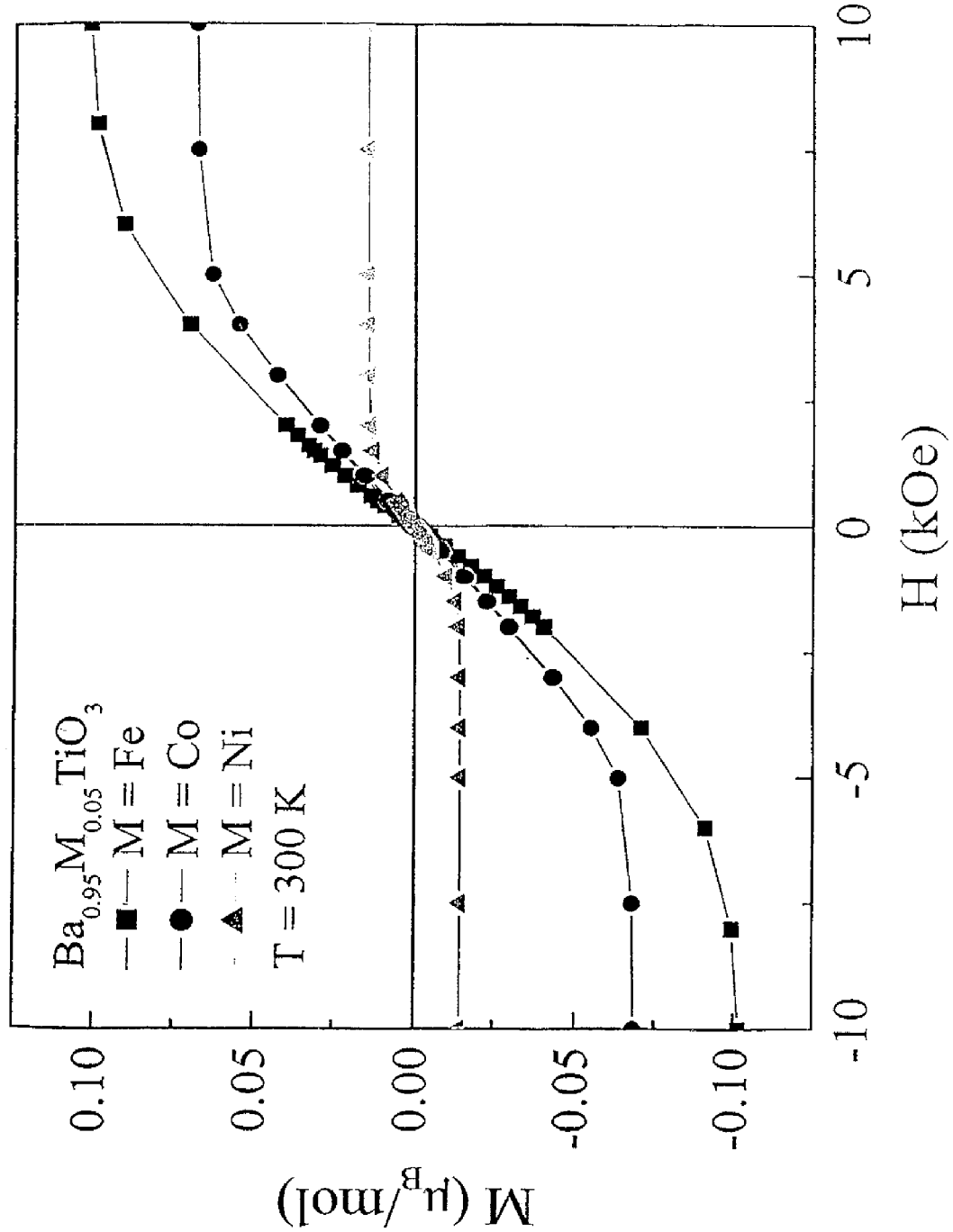
FIG. 3 illustrates plots of magnetization ($\mu_B$/mol) measured as a function of magnetic field at a temperature of 300 K by SQUID magnetometer for a series of (Ba$_{0.95}$M$_{0.05}$)TiO$_3$ with M=Fe, Co, and Ni.
Figure 4:
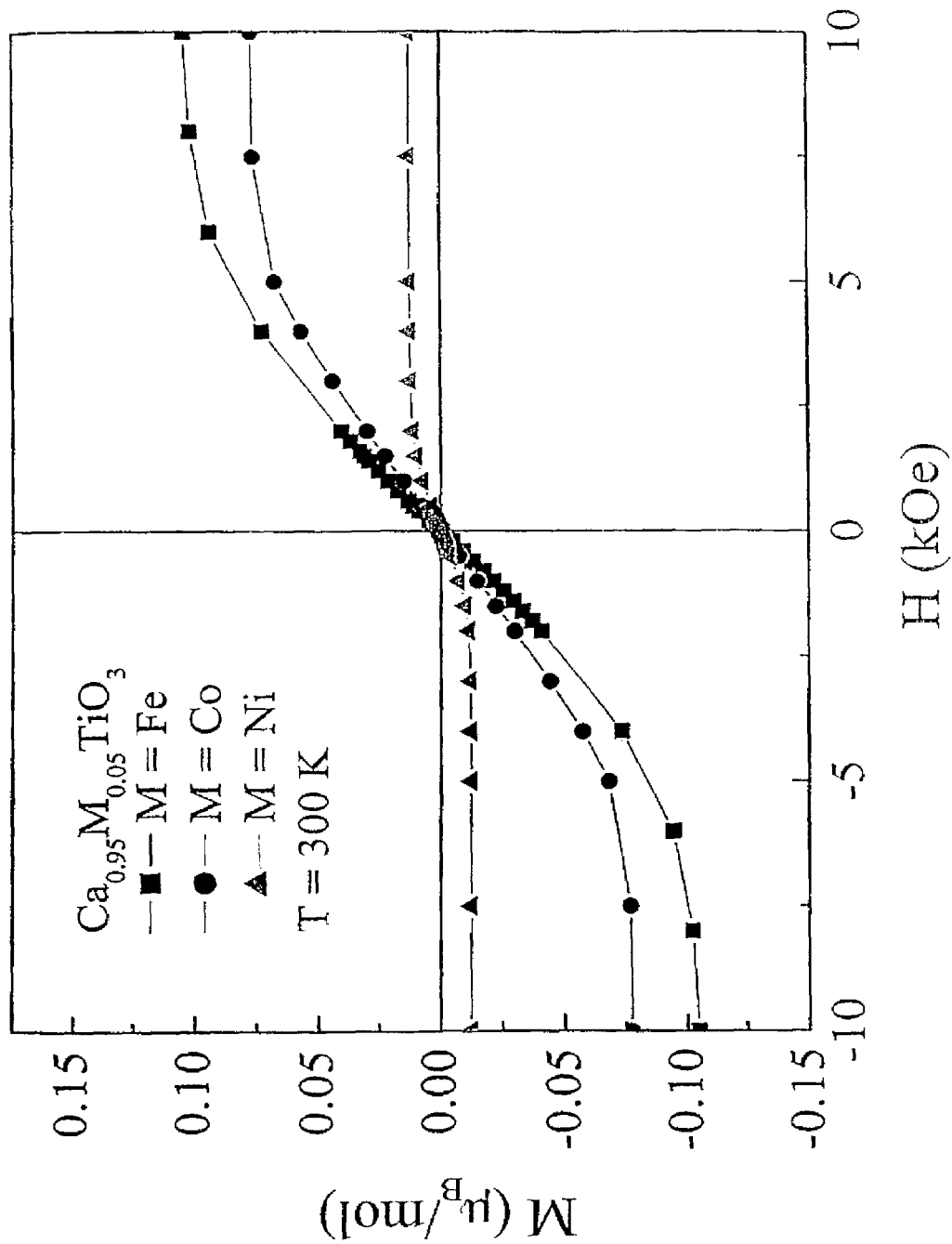
FIG. 4 illustrates plots of magnetization ($\mu_B$/mol) measured as a function of magnetic field at a temperature of 300 K by SQUID magnetometer for a series of (Ca$_{0.95}$M$_{0.05}$)TiO$_3$ with M=Fe, Co, and Ni.

Two series of bulk samples of $(Ca_{0.95}M_{0.05})TiO_3$ and $(Ba_{0.95}M_{0.05})TiO_3$ with M=Fe, Co, and Ni were prepared. FIG. 3 and FIG. 4 are magnetization curves of $(Ca_{0.95}M_{0.05})$ TiO_3$ and $(Ba_{0.95}M_{0.05})TiO_3$ with M=Fe, Co, and Ni, respectively. All of the samples shows ferromagnetic property. The saturation magnetization decreases in a sequence of Fe, Co and Ni which is consistent with the sequence for pure Fe2+, Co2+, and Ni2+ except Ni doped materials has relatively lower magnetization.

Figure 5:
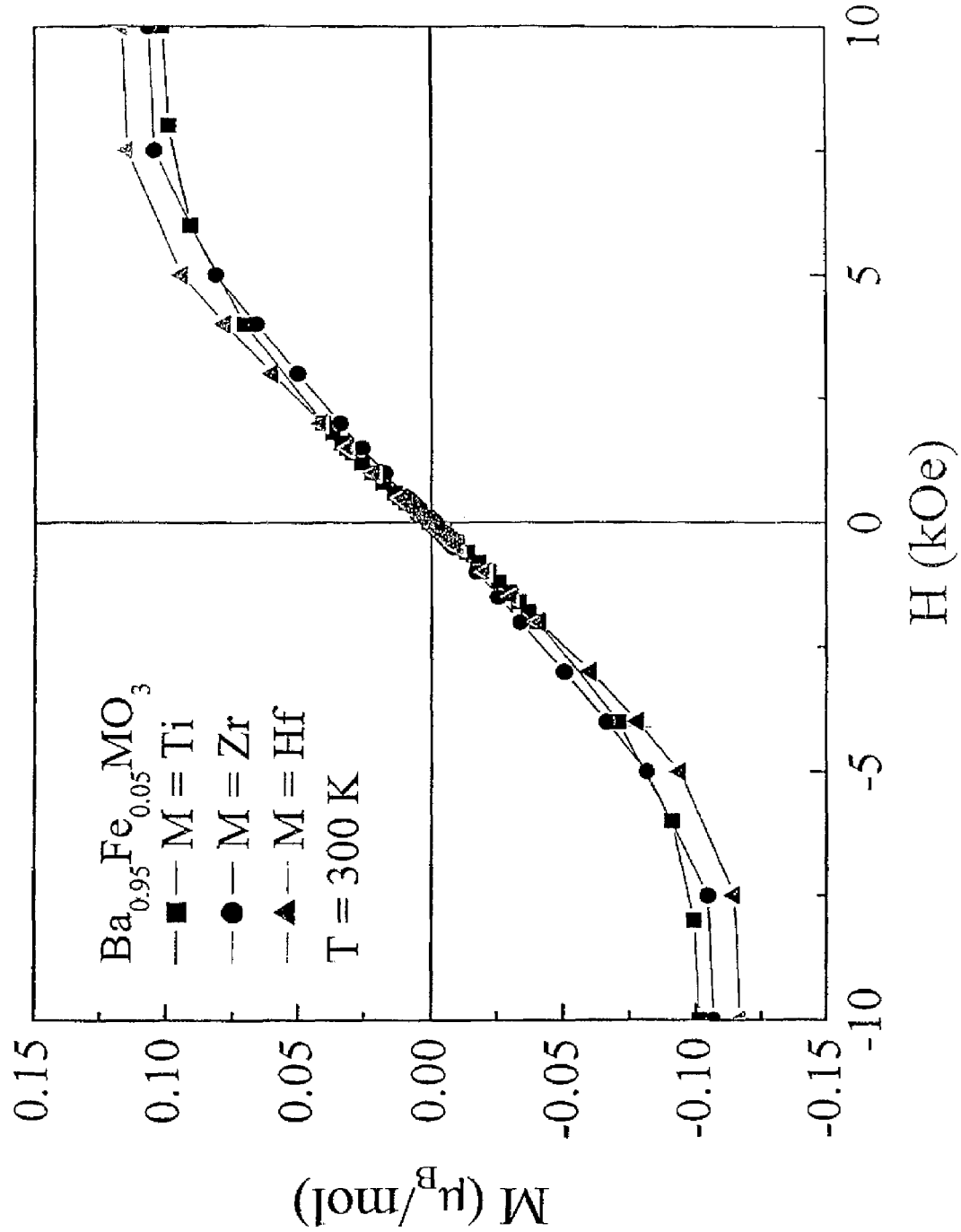
FIG. 5 illustrates plots of magnetization ($\mu_B$/mol) measured as a function of magnetic field at a temperature of 300 K by SQUID magnetometer for a series of (Ba$_{0.95}$Fe$_{0.05}$)BO$_3$ with B=Ti, Zr, and Hf.
Figure 6:
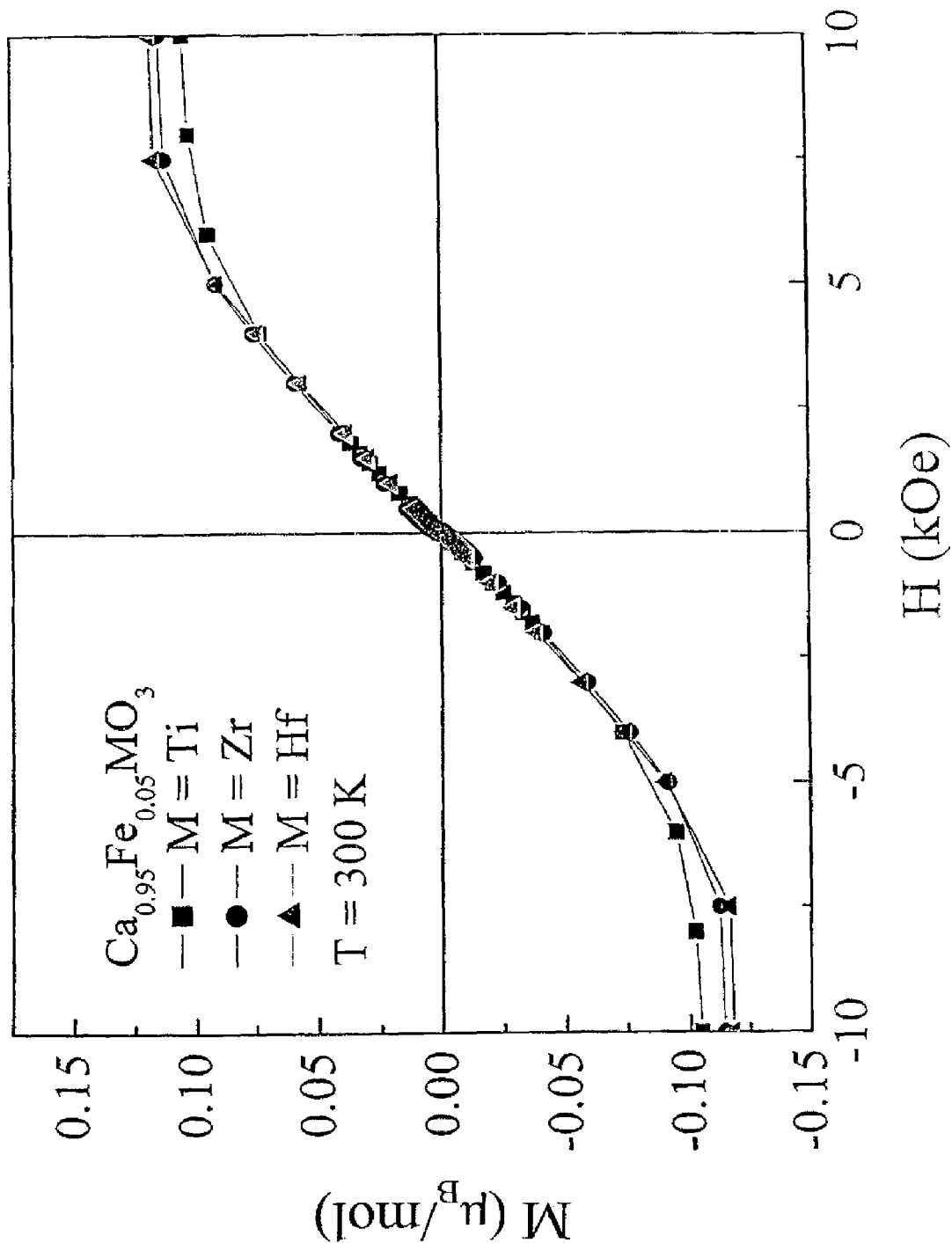
FIG. 6 illustrates plots of magnetization ($\mu_B$/mol) measured as a function of magnetic field at a temperature of 300 K by SQUID magnetometer for a series of (Ca$_{0.95}$Fe$_{0.05}$)BO$_3$ with B=Ti, Zr, and Hf.

Two series of bulk samples of $(Ca_{0.95}F_{0.05})BO_3$ and $(Ba_{0.95}Fe_{0.05})BO_3$ with B=Ti, Zr, and Hf were prepared. FIG. 5 and FIG. 6 are magnetization curves of $(Ca_{0.95}Fe_{0.05})BO_3$ and $(Ba_{0.95}Fe_{0.05})BO_3$ with B=Ti, Zr, and Hf, respectively. All of the samples show ferromagnetic property. The saturation magnetization increases slightly in a sequence of Ti, Zr, and Hf at B sites for both $(Ca_{0.95}F_{0.05})BO_3$ and $(Ba_{0.95}Fe_{0.05})BO_3$.

Figure 7:
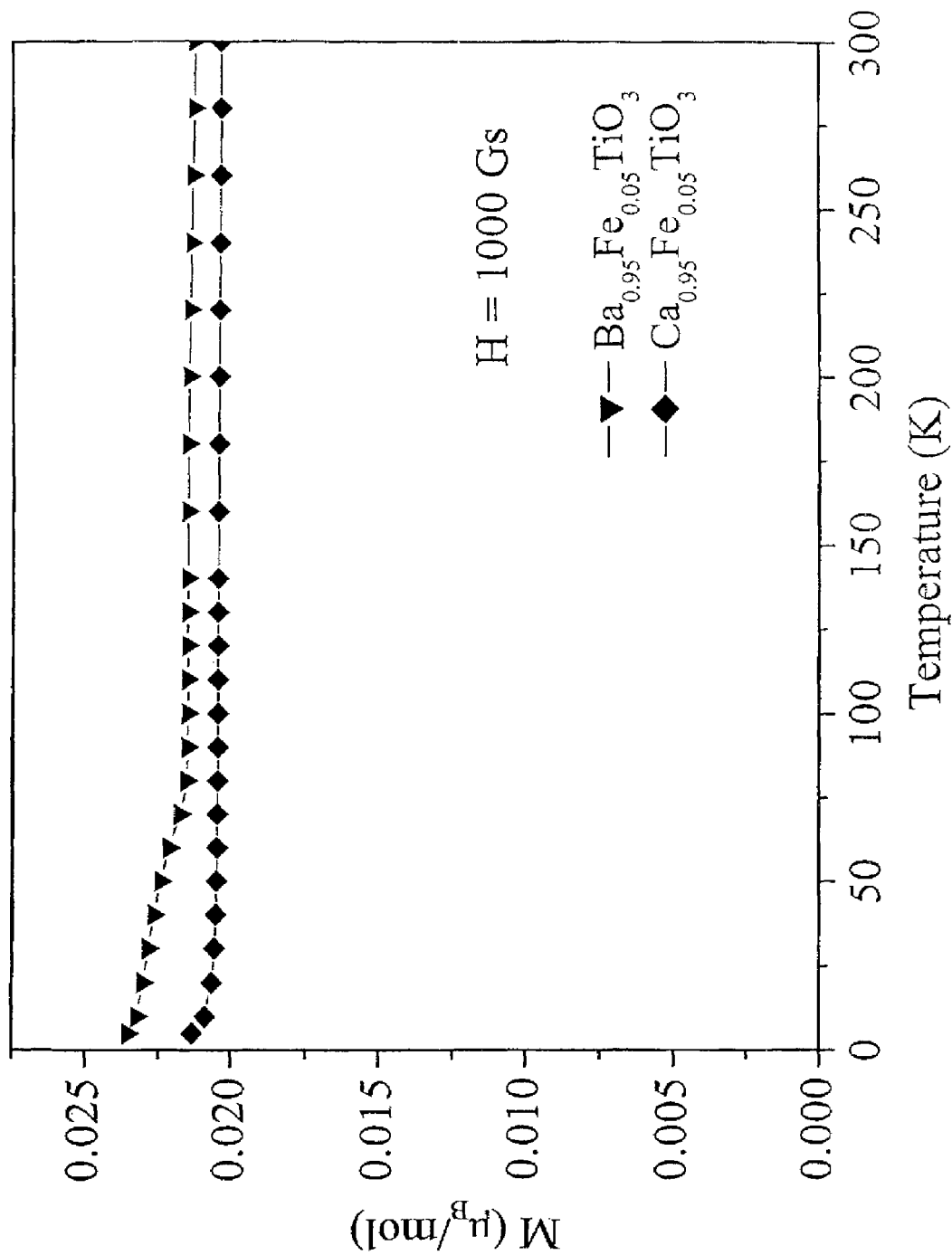
FIG. 7 is a curve of magnetization as a function of temperature for (Ba$_{0.95}$Fe$_{0.05}$)TiO$_3$ and (Ca$_{0.95}$Fe$_{0.05}$)TiO$_3$ from 5 K to 300 K by SQUID magnetometer.
Figures 8A, 8B:
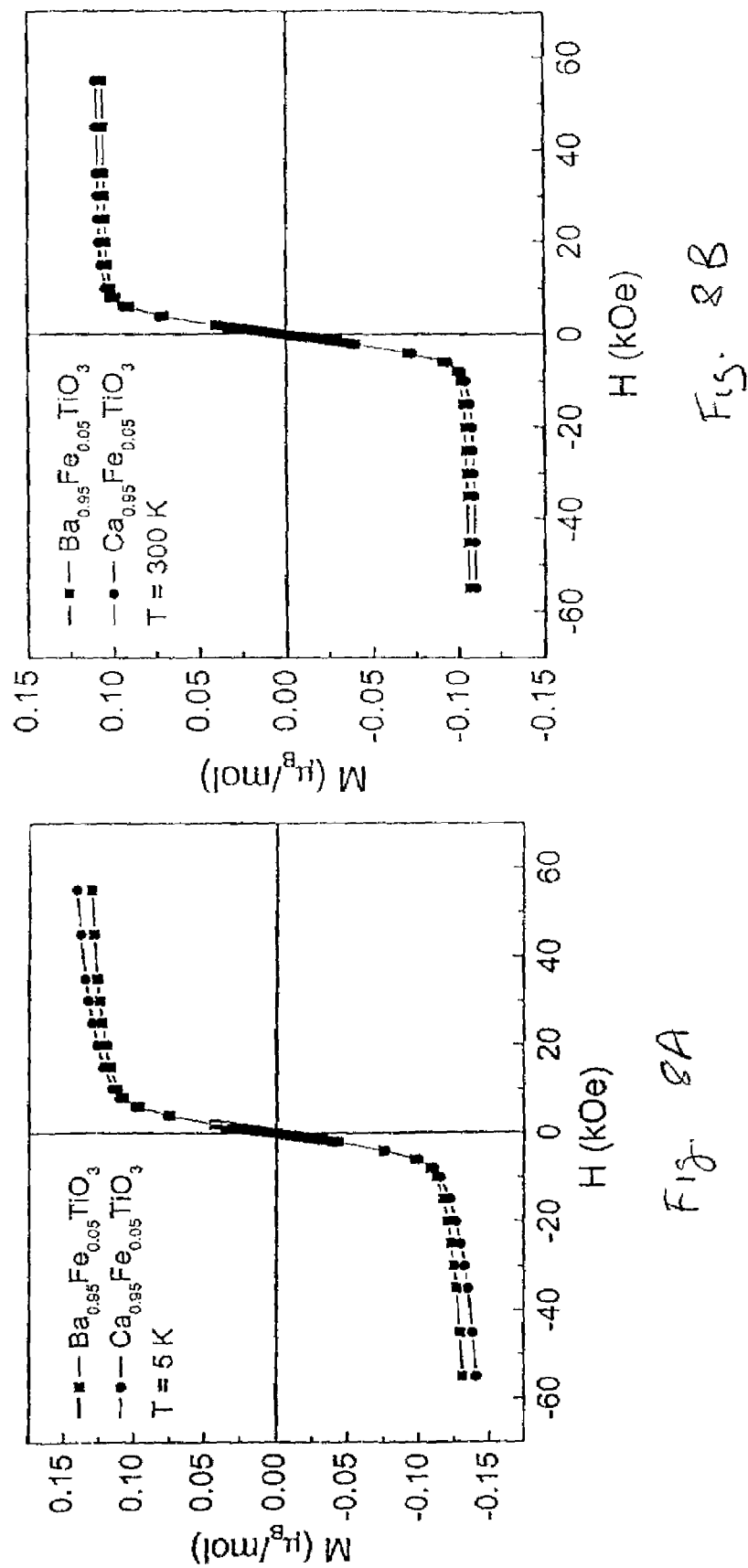
FIGS. 8A and 8B depict hysteresis loops of (Ba$_{0.94}$Fe$_{0.05}$)TiO$_3$ and (Ca$_{0.94}$Fe$_{0.05}$)TiO$_3$ measured at 5 K and 300 K by a SQUID magnetometer.

FIG. 7 is a curve of magnetization as a function of temperature for $(Ba_{0.95}Fe_{0.05})TiO_3$ and $(Ca_{0.95}Fe_{0.05})TiO_3$ from 5 K to 300 K. The Curie temperature is clearly higher than 300 K. The complete hysteresis loops of $(Ba_{0.95}Fe_{0.05})TiO_3$ and $(Ca_{0.95}Fe_{0.05})TiO_3$ are measured at 5 K and 300 K as shown in FIG. 8.

The coercive fields and remnant magnetization at temperatures of 5 K and 300 K for selected samples are listed in Table 1.

TABLE 1

Magnetic Properties of $(Ba_{0.95}Fe_{0.05})MO_3$ and $(Ca_{0.95}Fe_{0.05})MO_3$ (M = Ti, Zr, Hf)

|  | Hc(300 K) (Oe) | Mr(300 K) × $10^{-4}$ μB/Mol | Hc(5 K) (Oe) | Mr(5 K) × $10^{-4}$ μB/Mol |
|---|---|---|---|---|
| $(Ba_{0.95}Fe_{0.05})TiO_3$ | 16 | 3.84 | 26 | 7.55 |
| $(Ca_{0.95}Fe_{0.05})TiO_3$ | 12 | 2.7 | 26 | 5.96 |
| $(Ba_{0.95}Fe_{0.05})ZrO_3$ | 25 | 4.6 | 51 | 9.6 |
| $(Ca_{0.95}Fe_{0.05})ZrO_3$ | 4.5 | 2.3 | 103 | 3.4 |
| $(Ba_{0.95}Fe_{0.05})HfO_3$ | 20 | 4.5 | 51 | 11 |
| $(Ca_{0.95}Fe_{0.05})HfO_3$ | 7 | 2.3 | 68 | 16 |

Figure 9:
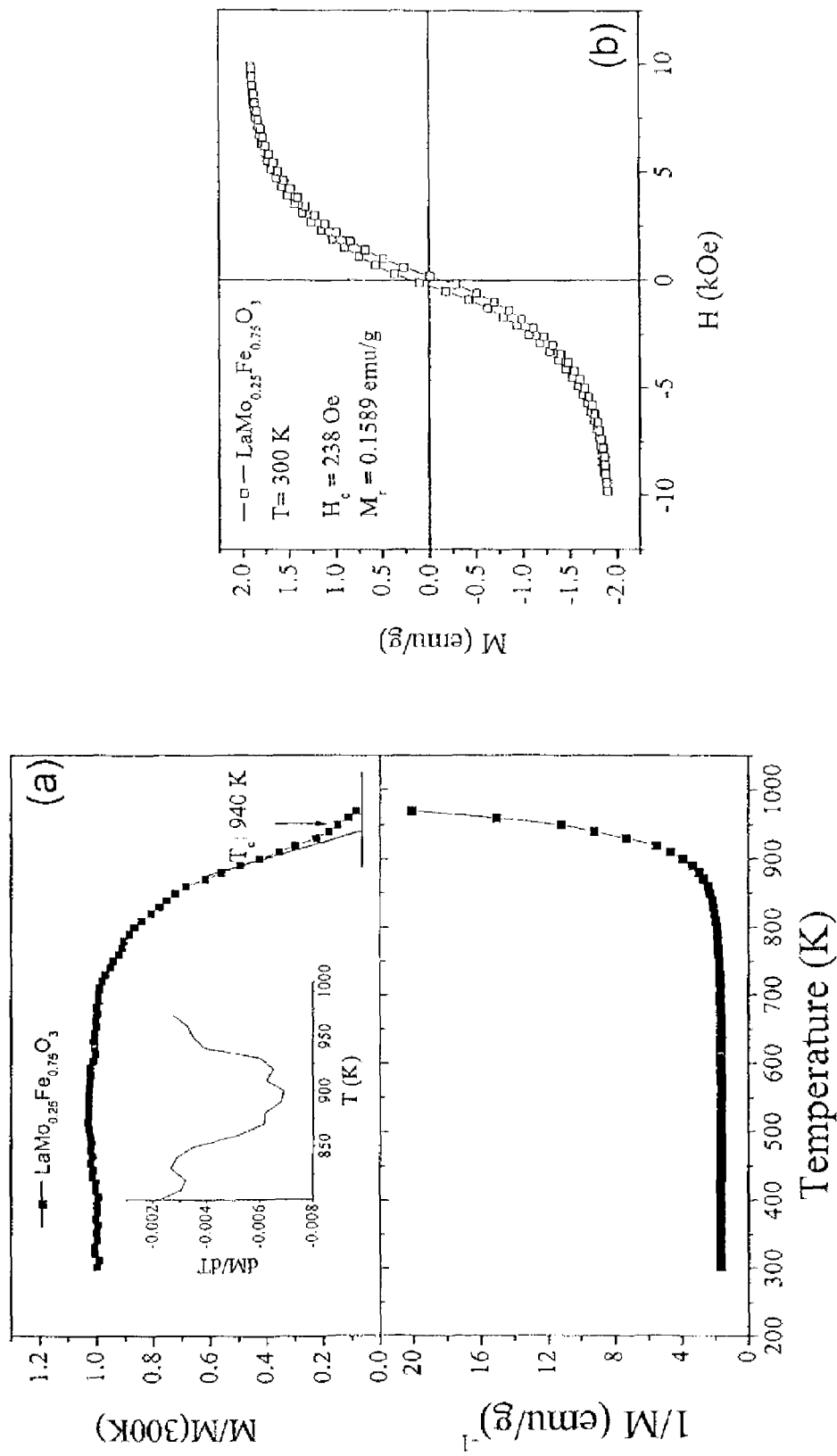
FIG. 9 is the (a) Magnetization vs Temperature, (b) hysteresis loop of La(Mo$_{0.25}$Fe$_{0.75}$)O$_3$ at 300 K measured using vibration vibrating samples magnetometer (VSM).

FIG. 9(a) is a curve of magnetization as function of temperature for bulk sample $La(Mo_{0.25}Fe_{0.75})O_3$. The curie temperature of the sample is as high as 940 K, and different that of the candidate impurity phase, $Fe_3O_4$ (850 K), which strongly rules out the existence of magnetic impurity $Fe_3O_4$ phase on the sample, and demonstrates the magnetic contribution of the doped Fe ions. The hysteresis loop of the sample measured at 300 K using VSM is shown in FIG. 9(b). The coercive fields and remanent magnetization at temperatures of 300 K is 238 Oe and 0.1589 emu/g respectively.

Figure 10:
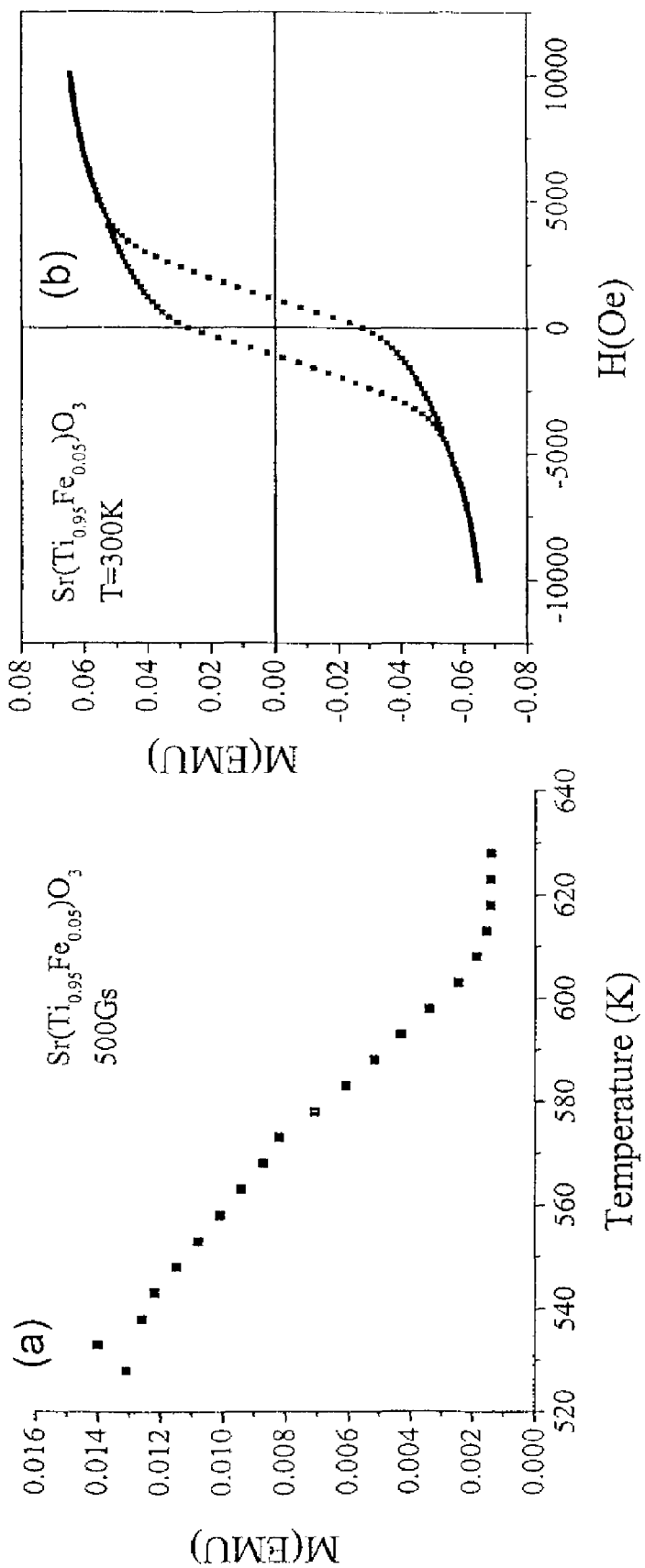
FIG. 10 is the (a) Magnetization vs Temperature, (b) hysteresis loop of Sr(Fe$_{0.05}$Ti$_{0.95}$)O$_3$ at 300 K measured using vibration vibrating samples magnetometer (VSM).

FIG. 10 shows the magnetic properties of the Fe-doped $SrTiO_3$ with 5% Fe substituting Ti. The sample was annealed under reduced atmosphere ($N_2+5\% H_2$). It is clear that the sample exhibits ferromagnetism at room temperature with large coercive field (1170 Oe, see FIG. 10b) and a high curie temperature (610 K, see FIG. 10a)). The curie temperature of 530 K can strongly evidence that the magnetism of the sample is from the doped Fe ion in the host lattices, rather than from the most possible impurity magnetic phase $Fe_3O_4$.

The invention claimed is:

1. A ferromagnetic perovskite oxide having the formula $(Ba_{0.95}Fe_{0.05})TiO_3$, wherein the oxide has a saturation magnetization of about 0.10 $\mu_B$/mol Fe at 300 K, and a coercive field of about 16 Oe at 300 K.

2. A ferromagnetic perovskite oxide having the formula $(Ca_{0.95}Fe_{0.05})TiO_3$, wherein the oxide has a saturation magnetization of about 0.11 $\mu_B$/mol Fe at 300 K, and a coercive field of about 12 Oe at 300 K.

3. A ferromagnetic perovskite oxide having the formula $(Ba_{0.95}Fe_{0.05})ZrO_3$, wherein the oxide has a saturation magnetization of about 0.11 $\mu_B$/mol Fe at 300 K, and a coercive field of about 25 Oe at 300 K.

4. A ferromagnetic perovskite oxide having the formula $(Ca_{0.95}Fe_{0.05})ZrO_3$, wherein the oxide has a saturation magnetization of about 0.12 $\mu_B$/mol Fe at 300 K, and a coercive field of about 4.5 Oe at 300 K.

5. A ferromagnetic perovskite oxide having the formula $(Ba_{0.95}Fe_{0.05})HfO_3$, wherein the oxide has a saturation magnetization of about 0.125 $\mu_B$/mol Fe at 300 K, and a coercive field of about 20 Oe at 300 K.

6. A ferromagnetic perovskite oxide having the formula $(Ca_{0.95}Fe_{0.05})HfO_3$, wherein the oxide has a saturation magnetization of about 0.12 $\mu_B$/mol Fe at 300 K, and a coercive field of about 7 Oe at 300 K.

7. A ferromagnetic perovskite oxide having the formula $La(Mo_{0.25}Fe_{0.75})O_3$, wherein the magnetic Curie temperature of the oxide is as high as 940 K, and wherein the oxide has a coercive field of about 238 Oe at 300 K.

* * * * *

UNITED STATES PATENT AND TRADEMARK OFFICE
CERTIFICATE OF CORRECTION

PATENT NO. : 7,597,817 B1 Page 1 of 1
APPLICATION NO. : 10/829590
DATED : October 6, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 147 days.

Signed and Sealed this

Twenty-eighth Day of September, 2010

David J. Kappos
*Director of the United States Patent and Trademark Office*